(No Model.)

W. N. CANDEE.
AUTOMATIC TWINE HOLDER.

No. 409,137. Patented Aug. 13, 1889.

Witnesses,
Arthur J. Sangster
Robert A. Geary

William N. Candee, Inventor.
By James Sangster
Attorney.

N. PETERS, Photo-Lithographer, Washington, D. C.

UNITED STATES PATENT OFFICE.

WILLIAM N. CANDEE, OF BUFFALO, NEW YORK, ASSIGNOR TO HIMSELF AND GEORGE S. THORNE, OF SAME PLACE.

AUTOMATIC TWINE-HOLDER.

SPECIFICATION forming part of Letters Patent No. 409,137, dated August 13, 1889.

Application filed January 2, 1889. Serial No. 295,125. (No model.)

*To all whom it may concern:*

Be it known that I, WILLIAM N. CANDEE, a citizen of the United States, residing at Buffalo, in the county of Erie and State of New York, have invented certain new and useful Improvements in Automatic Twine-Holders, of which the following is a specification.

My invention relates to certain new and useful improvements in automatic twine-holders adapted to be hung up overhead out of the way, whereby, whenever any desired length of twine is drawn out and broken off and the surplus twine released, it is automatically drawn back again to the twine-holder, so as to leave enough hanging out to be within easy reach when required for use, all of which will be fully and clearly hereinafter described and claimed, reference being had to the accompanying drawings, in which—

Figure 1:
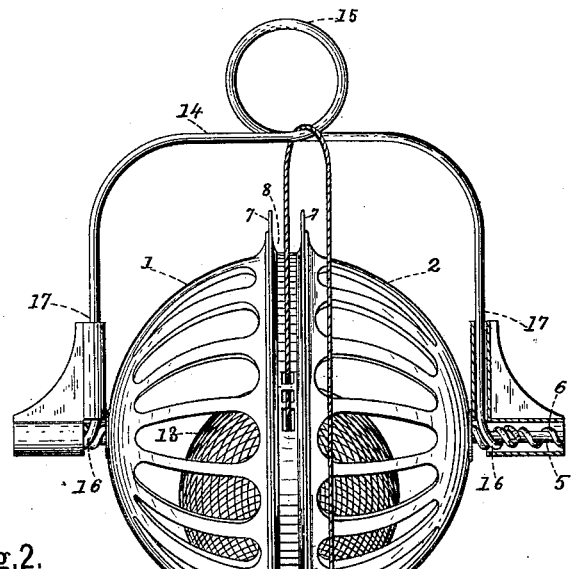
Figure 2:
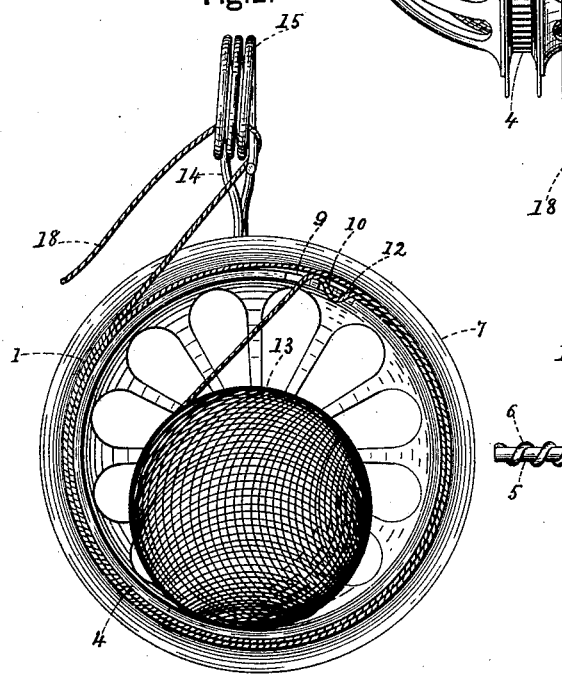
Figure 3:
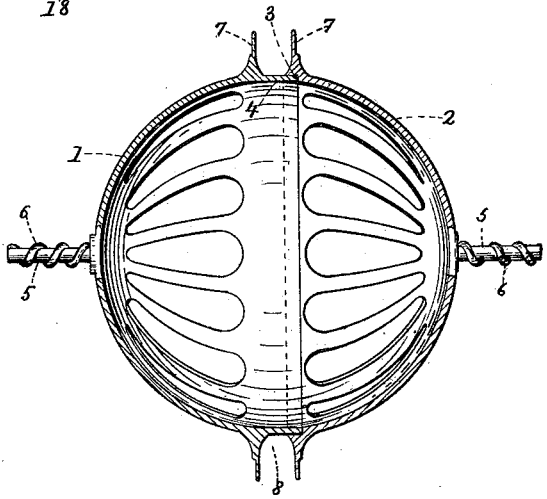

Figure 1 is a front elevation of the device complete, one of the case-coverings for the screw-bearings being in section. Fig. 2 is a side elevation, one-half being left off, so as to show the interior construction and the ball of twine and its connection therewith. Fig. 3 is a sectional elevation cutting through the two halves of the shell or case, (excepting the two screw-bearings,) so as to show how the two halves are put together.

The case for holding the ball of twine is made in two semi-spherical portions 1 and 2, and is preferably formed of cast-iron, having a series of openings through it, of any suitable ornamental shape, to insure lightness. The half 2 of this case is provided with a circular recess 3, (see Fig. 3,) surrounding its inner edge, into which the projecting rim 4 of the case 1 passes and fits, as shown in said Fig. 3, so that the two portions of the case fit together nicely and are easily removable.

To the outside center of each half of the case and firmly secured to it is a bearing 5, having a screw-thread 6, secured thereto in any well-known way, which screw-threads 6, as will be seen, are right and left handed. Each bearing 5 projects outward in opposite directions, so as to be in a line with each other, and each half 1 and 2 is provided with a circular outwardly-projecting rib or flange 7, adapted to leave a surrounding groove 8 between them, into which the surplus twine is wound by turning the case, as will be more clearly hereinafter shown.

In the lower part or bottom of the groove 8 are three or more perforations 9, 10, and 12, through which the twine is passed from the ball 13, (inside of the case.) It is passed back and forth through these perforations to insure sufficient friction while it is being drawn through.

The bail 14, by which the device is adapted to be suspended overhead, or in any position it may be desired for use, is constructed of spring-wire of any suitable material, spring-brass wire or steel being preferred. It is made in the form of a spring having two or more turns 15, and the ends are bent in the form of a spiral 16, so as to clasp around the bearings 5 and lie between the screw-threads 6. This bail 14 is made so that the lower ends spring toward each other, and thereby hold the two halves of the case together.

The operation of the device is as follows: The two halves of the case being opened against the force of the springs, which keep them together, the ball of twine 13 is inserted and the end of the twine passed up through the hole 9, then down through the hole 10, and up through the hole 12. (See Fig. 2.) The two halves are now put together, as in Fig. 1, and as much surplus twine as may be required is wound around the case by turning it around, so that the screw-bearings cause the arms 17 of the spring-bail to be moved outward by means of the right and left hand screws, in accordance with the number of turns made. The end of the twine is then preferably passed through the looper-coil 15, leaving enough hanging out to be conveniently reached when required. When the end 18 of the twine is now drawn out, it first turns the case and unwinds the surplus twine and then draws from the ball as much as may be required for use, which is then broken off and the end 18 released, when each of the arms 17 of the spring-bail begins to act on the screw-bearings by moving in toward the case, and, by acting upon the screw-threads 6, causes the case to turn until the arms 17 touch the sides of the case, when the surplus twine is all wound up and enough of the end 18 left hanging out to be conveniently reached again when required.

The shape of the spring-bail may be varied without changing the nature of the invention, so long as it acts to turn the case, as described, and the form of the two halves of the case may be changed and still be adapted to operate substantially as described. I therefore do not wish to limit myself to the exact shape of either the spring-bail or case.

I claim as my invention—

In an automatic twine-holder, the combination of a holding-case formed in two halves adapted to fit together and leave a groove surrounding them to receive the surplus twine, two steep-pitched screw-bearings rigidly secured to each half of the case, a spring-bail having a screw on each lower end of the bail-arms adapted to receive the screw-bearings, so they can turn therein and move the ends of the bail-arms to or from the case, and perforations through the bottom of the surrounding groove, through which the twine is passed, substantially as described.

WILLIAM N. CANDEE.

Witnesses:
LOUIS T. TERRY,
JAMES SANGSTER.